(12) United States Patent
Liu et al.

(10) Patent No.: US 11,967,219 B2
(45) Date of Patent: Apr. 23, 2024

(54) SYSTEM AND METHOD OF NOTIFYING AN OWNER OF A LOST ITEM IN A VEHICLE

(71) Applicant: GM Global Technology Operations LLC, Detroit, MI (US)

(72) Inventors: Ke Liu, Lexington, MA (US); Jingyan Wan, Sterling Heights, MI (US); Ron Hecht, Raanana (IL); Omer Tsimhoni, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 267 days.

(21) Appl. No.: 17/587,572

(22) Filed: Jan. 28, 2022

(65) Prior Publication Data
US 2023/0245550 A1 Aug. 3, 2023

(51) Int. Cl.
*G08B 21/24* (2006.01)
*B60R 1/29* (2022.01)
*G06Q 10/087* (2023.01)
*G06T 11/00* (2006.01)

(52) U.S. Cl.
CPC ............... *G08B 21/24* (2013.01); *B60R 1/29* (2022.01); *G06Q 10/087* (2013.01); *G06T 11/00* (2013.01); *B60R 2300/8006* (2013.01)

(58) Field of Classification Search
CPC ... G08B 21/24; B60R 1/29; B60R 2300/8006; G06Q 10/087; G06T 11/00; G05B 23/0221
USPC ........................................................ 340/576
See application file for complete search history.

(56) References Cited

U.S. PATENT DOCUMENTS

| | | | | |
|---|---|---|---|---|
| 2003/0016130 | A1* | 1/2003 | Joao ...................... | B60R 25/252 340/13.24 |
| 2009/0295921 | A1* | 12/2009 | Fujita ..................... | H04N 7/183 348/148 |
| 2012/0068813 | A1* | 3/2012 | Karttaavi ................ | G01S 13/74 340/5.2 |
| 2018/0197029 | A1* | 7/2018 | Ali ......................... | G06V 20/59 |

OTHER PUBLICATIONS

Utexas, cylindrical and spherical coordinates, Apr. 15, 2021, p. 1. (Year: 2021).*

* cited by examiner

*Primary Examiner* — Brian Wilson
(74) *Attorney, Agent, or Firm* — Vivacqua Crane PLLC

(57) ABSTRACT

A method of notifying an owner of a lost item in a vehicle having a vehicle compartment is provided. The method comprises providing at least one sensor to sense the lost item in the vehicle compartment. The method further comprises sensing the lost item on a point relative to a spherical coordinate system to define a sensed item data and determining a position of the lost item in cartesian coordinates based on the sensed item data to define a position data. The method further comprises translating the sensed item data and the position data for visualization of the lost item to define an item image of the lost item relative to the vehicle compartment, and updating an inventory list of lost objects to include the lost item with the item image. The method further comprises identifying the owner of the lost item by way of a perception algorithm, providing notification to the owner of the lost item, and providing viewable access of the item image such that the image is viewed by the owner of the lost item.

19 Claims, 4 Drawing Sheets

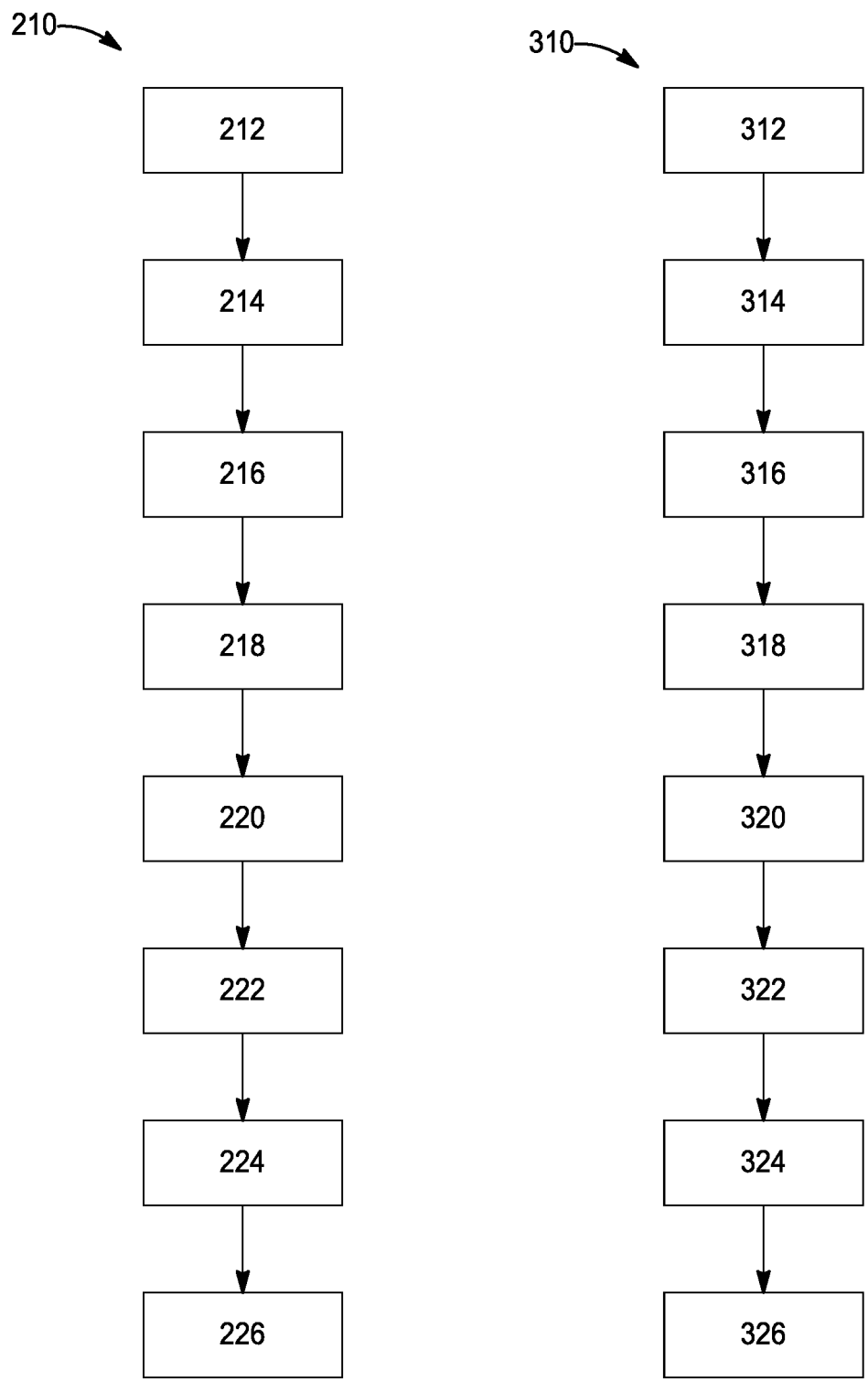

SYSTEM AND METHOD OF NOTIFYING AN OWNER OF A LOST ITEM IN A VEHICLE

INTRODUCTION

The present disclosure relates to sensing lost items in vehicles and more particularly systems and methods of sensing a lost item in a vehicle and notifying an owner of the lost item.

As the automotive industry continues with technological advancements, especially in shared vehicles, there will be a continued increase in vehicles with multiple users. With the increase in multiple users per vehicle, a likelihood of lost items increases as well.

SUMMARY

Thus, while current ways of identifying a lost item and notifying an owner of the lost item achieve their intended purposes, there is a need for a new and improved system and method of identifying a lost item and notify an owner of the lost item in a vehicle compartment.

In accordance with one aspect of the present disclosure, a method of notifying an owner of a lost item in a vehicle having a vehicle compartment is provided. The method comprises providing at least one sensor to sense the lost item in the vehicle compartment. In this aspect, the method further comprises sensing the lost item on a point relative to a spherical coordinate system to define a sensed item data and determining a position of the lost item in cartesian coordinates based on the sensed item data to define a position data. The method further comprises translating the sensed item data and the position data for visualization of the lost item to define an item image of the lost item relative to the vehicle compartment. The method further comprises updating an inventory list of lost objects to include the lost item with the item image and identifying the owner of the lost item by way of a perception algorithm. Furthermore, the method comprises providing notification to the owner of the lost item and providing viewable access of the item image such that the image is viewed by the owner of the lost item.

In one example, the point relative to the spherical coordinate system is defined by a distance r, a first angle ($\theta$), and a second angle ($\varphi$). The lost item has cartesian coordinates has an x-axis, a y-axis, and a z-axis derived as, $x = r \sin \theta \cos \varphi$ $y = r \sin \theta \sin \varphi$ $z = r \cos \theta$ In another example, the step of determining the position of the lost item comprises the sensor being arranged to have two of roll, pitch, and yaw rotational movements when the sensor senses in a fixed location in the vehicle compartment. In yet another example, the step of determining the position of the lost item comprises the sensor being arranged to have one of roll, pitch, and yaw rotational movements when the sensor senses in movement along the x-axis such that the first angle $\theta$ is calculated as:

$$\theta = \sin^{-1} \frac{x}{r \cdot \cos \varphi}.$$

In still another example, the step of determining the position of the lost item comprises the sensor being arranged to have one of roll, pitch, and yaw rotational movements when the sensor senses in movement along the x-axis and y-axis such that the second angle $\varphi$ is calculated as:

$$\varphi = \tan^{-1} \left( \frac{y}{x} \right).$$

In one example, the at least one sensor is fixedly disposed in the vehicle compartment. In another example, the at least one sensor is disposed in the vehicle compartment and movable along the x-axis. In another example, the at least one sensor is disposed in the vehicle compartment and movable along the x-axis and y-axis. In yet another example, the at least one sensor may be an ultrasonic sensor, an RFID sensor, or any other suitable sensor without departing from the spirit or scope of the present disclosure.

In one example, the step of identifying the owner of the lost item comprises scanning the vehicle compartment. The step of identifying further comprises detecting the user in the vehicle compartment. The step of identifying further comprises pairing the user with the lost item by way of the perception algorithm.

In accordance with another aspect of the present disclosure, a system for notifying an owner of a lost item in a vehicle having a vehicle compartment is provided. The system comprises at least one sensor disposed in the vehicle compartment and arranged to sense the lost item on a point relative to a spherical coordinate system to define a sensed item data. In this example, the system further comprises an electronic control unit (ECU) is disposed in the vehicle and in communication with the at least one sensor. Moreover, the ECU is arranged to determine a position of the lost item in cartesian coordinates based on the sensed item data to define a position data. The ECU is further arranged to translate the sensed item data and the position data for visualization of the lost item to define an item image of the lost item relative to the vehicle compartment. Additionally, the ECU is arranged to update an inventory list of lost objects to include the lost item with the item image. Furthermore, the ECU is arranged to identify the owner of the lost item by way of a perception algorithm.

In this aspect, the system further comprises a cloud server disposed remotely from the vehicle and in communication with the ECU. The cloud server arranged to provide notification to the owner of the lost item. Moreover, the cloud server arranged to provide viewable access of the item image such that the image is viewed by the owner of the lost item.

In one embodiment, the point relative to the spherical coordinate system is defined by a distance r, a first angle ($\theta$), and a second angle ($\varphi$). Moreover, the lost item has cartesian coordinates having an x-axis, a y-axis, and a z-axis derived as, $x = r \sin \theta \cos \varphi$ $y = r \sin \theta \sin \varphi$ $z = r \cos \theta$ In one embodiment, the ECU being arranged to determine a position of the lost item comprises the sensor being arranged to have two of roll, pitch, and yaw rotational movements when the sensor senses in a fixed location in the vehicle compartment. In another embodiment, the ECU being arranged to determine a position of the lost item comprises the sensor being arranged to have one of roll, pitch, and yaw rotational movements when the sensor senses in movement along the x-axis such that the first angle θ is calculated as:

$$\theta = \sin^{-1}\frac{x}{r\cdot\cos\varphi}.$$

In another embodiment, the ECU being arranged to determine a position of the lost item comprises the sensor being arranged to have one of roll, pitch, and yaw rotational movements when the sensor senses in movement along the x-axis and y-axis such that the second angle φ is calculated as:

$$\varphi = \tan^{-1}\left(\frac{y}{x}\right).$$

In one embodiment, the at least one sensor is fixedly disposed in the vehicle compartment. In another embodiment, the at least one sensor is disposed in the vehicle compartment and movable along the x-axis. In yet another embodiment, the at least one sensor is disposed in the vehicle compartment and movable along the x-axis and y-axis. In another embodiment, the at least one sensor is one of an ultrasonic sensor and an radio frequency identification sensor.

In accordance with another aspect of the present disclosure, a method of notifying an owner of a lost item in a vehicle having a vehicle compartment is provided. The method comprises providing at least one sensor to sense the lost item in the vehicle compartment. Moreover, the method further comprises sensing the lost item on a point relative to a spherical coordinate system to define a sensed item data. In this aspect, the point is defined by a distance r, a first angle (θ), and a second angle (φ). The lost item has cartesian coordinates having an x-axis, a y-axis, and a z-axis derived as, x=r sin θ cos φ y=r sin θ sin φ z=r cos θ

The method further comprises determining a position of the lost item in cartesian coordinates based on the sensed item data to define a position data. The sensor is arranged to have two of roll, pitch, and yaw rotational movements when the sensor senses in a fixed location in the vehicle compartment, wherein the sensor is arranged to have one of roll, pitch, and yaw rotational movements when the sensor senses in movement along the x-axis such that the first angle θ is calculated as:

$$\theta = \sin^{-1}\frac{x}{r\cdot\cos\varphi}.$$

In this aspect, the sensor is arranged to have one of roll, pitch, and yaw rotational movements when the sensor senses in movement along the x-axis and y-axis such that the second angle φ is calculated as:

$$\varphi = \tan^{-1}\left(\frac{y}{x}\right).$$

Moreover, the method comprises translating the sensed item data and the position data for visualization of the lost item to define an item image of the lost item relative to the vehicle compartment. Further, the method comprises updating an inventory list of lost objects to include the lost item with the item image. Additionally, the method comprises identifying the owner of the lost item by way of a perception algorithm. The method further comprises providing notification to the owner of the lost item. Furthermore, the method comprises providing viewable access of the item image such that the image is viewed by the owner of the lost item.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 is a flowchart of a method of identifying an owner of a lost item in a vehicle having a vehicle compartment for the system of FIG. 1 in accordance with one example of the present disclosure.

FIG. 6 is a flowchart of a method of identifying an owner of a lost item in a vehicle having a vehicle compartment for the system of FIG. 1 in accordance with another example of the present disclosure.

DETAILED DESCRIPTION

The following description is merely exemplary in nature and is not intended to limit the present disclosure, application, or uses.

Embodiments and examples of the present disclosure provide systems and methods of identifying an owner of a lost item in a vehicle compartment. The embodiments and examples provide efficient, accurate, and cost effective ways of identifying a lost item and notifying an owner thereof. Such examples will not require new hardware on most existing vehicles and will not require any additional hardware on new vehicles.

Figure 1:
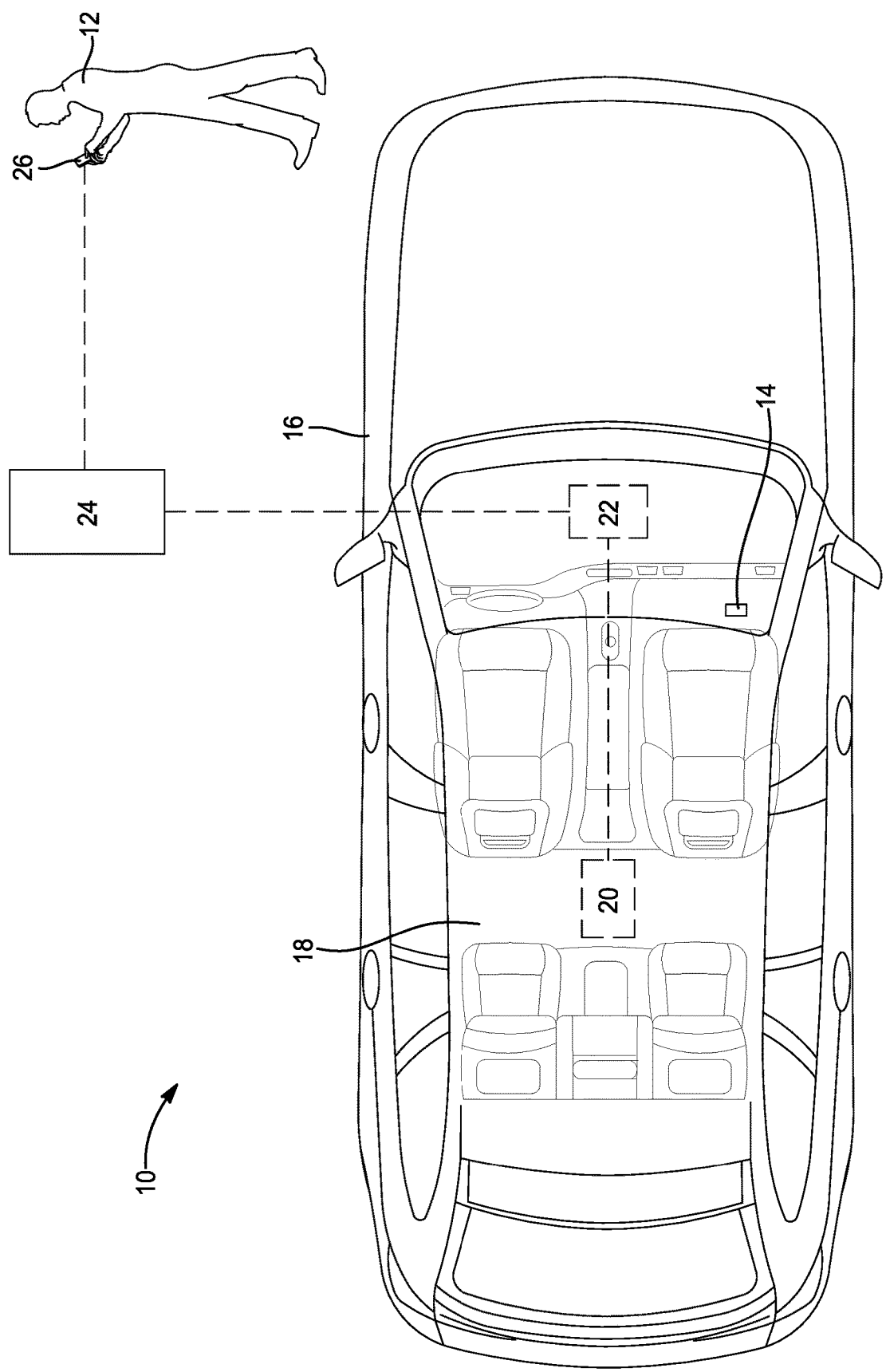
FIG. 1 is a schematic view of a system for identifying an owner of a lost item in a vehicle having a vehicle compartment in accordance with one embodiment of the present disclosure.

FIG. 1 depicts a system 10 for notifying an owner 12 of a lost item 14 in a vehicle 16 having a vehicle compartment 18 in accordance with one embodiment of the present disclosure. As shown, the system 10 comprises at least one sensor 20, an electronic control unit (ECU) 22 in communication with the sensor 20, and a cloud server 24 in communication with the ECU 22. Moreover, the cloud server 24 is in communication with a handheld device 26 of the owner 12 of the lost item 14.

Figure 2:
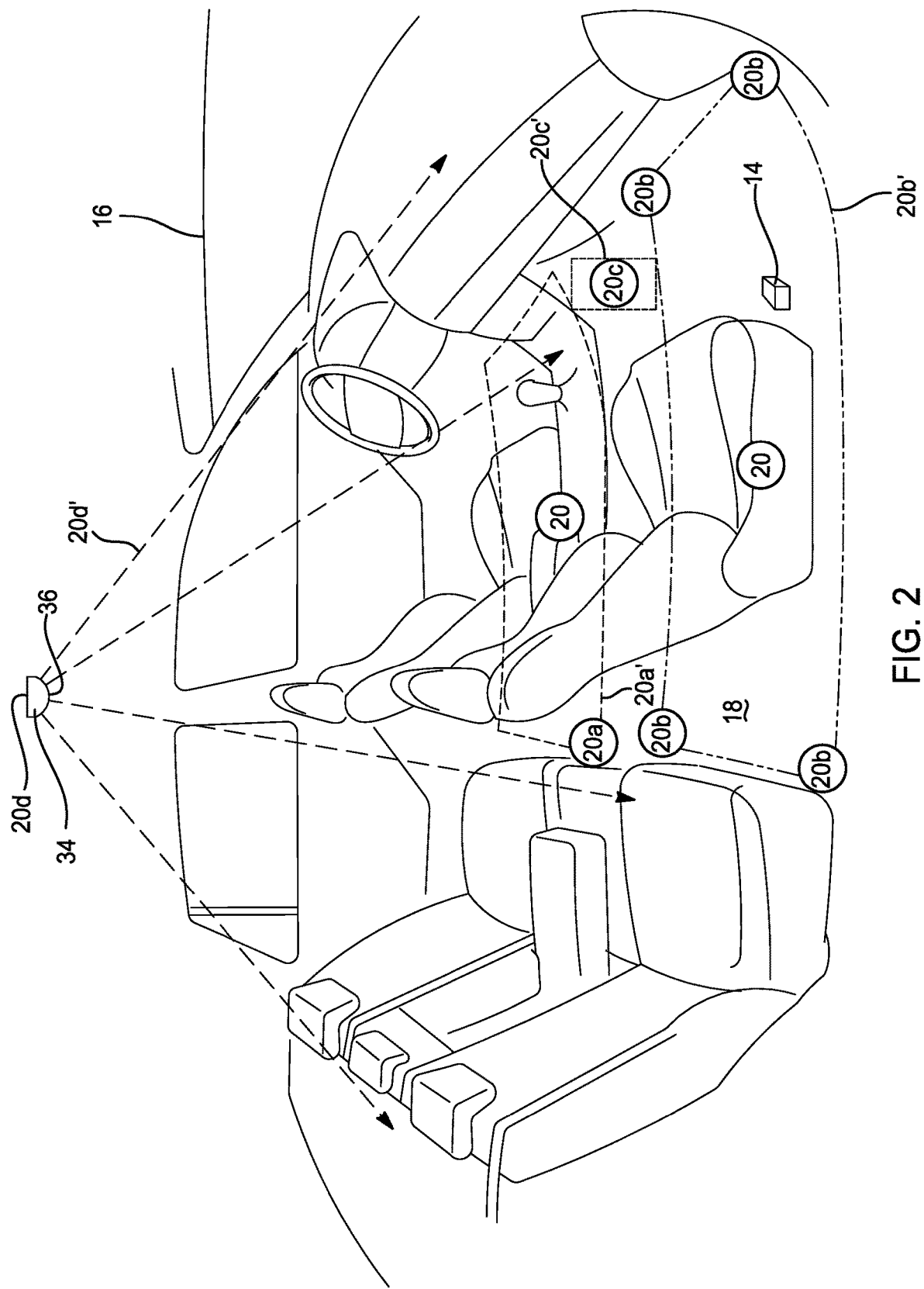
FIG. 2 is a perspective side view of a vehicle compartment in which the system of FIG. 1 is implemented in accordance with one example.

As illustrated in FIGS. 1-2, the at least one sensor 20 (e.g., an ultrasonic sensor) is disposed in the vehicle compartment 18. In the embodiment shown in FIG. 2, there are a plurality of sensors (20, 20a, 20b, 20c, 20d) disposed within the vehicle compartment 18 and having detection zones 20', 20a', 20b', 20c', 20d'. That is, the sensors may be disposed on the ceiling, the floor, the console, the interior panel, or in any other suitable location in the vehicle compartment 18 without departing from the spirit or scope of the present disclosure.

Figure 3:
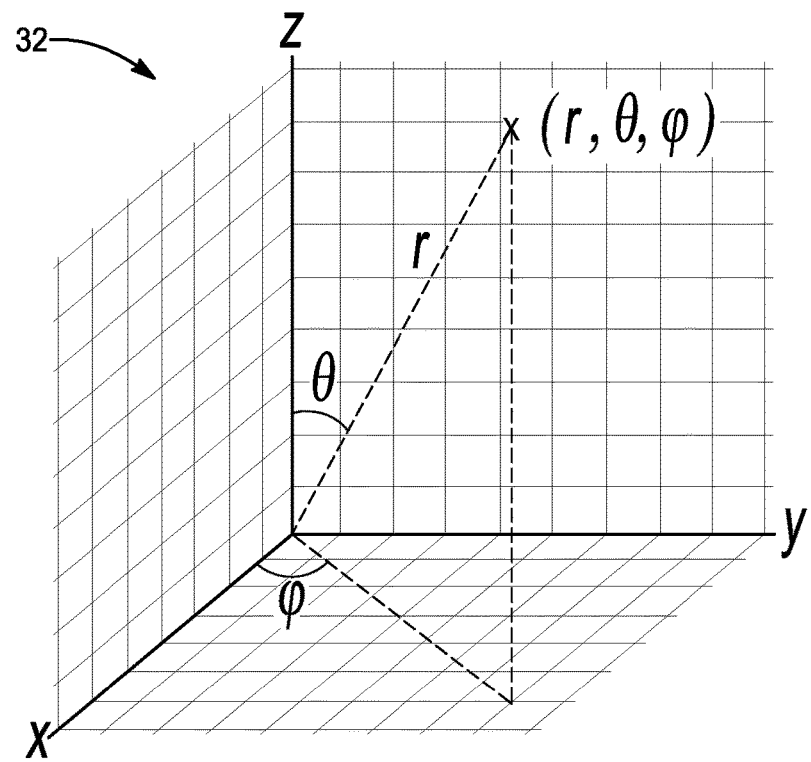
FIG. 3 is a graph of a spherical coordinate system from cartesian coordinates are derived for a lost item in one example.

As discussed in greater detail below, the sensor 20 may be arranged to sense the lost item 14 on a point 30 relative to a spherical coordinate system 32 in FIG. 3 to define a sensed item data. In one embodiment, the point 30 relative to the spherical coordinate system 32 is defined by a distance r, a first angle ($\theta$), and a second angle ($\varphi$). Moreover, the lost item 14 may be translated in cartesian coordinates having an x-axis, a y-axis, and a z-axis derived as, $$x = r \sin \theta \cos \varphi$$

$$y = r \sin \theta \sin \varphi$$

$$z = r \cos \theta$$

In one example, the sensor 20 is arranged to have two of roll, pitch, and yaw rotational movements when the sensor 20 senses from a fixed location in the vehicle compartment 18. That is, the sensor 20 may have a body 34 fixedly disposed in the vehicle compartment 18 and a lens 36 disposed within the body 34. Moreover, the lens 36 may be arranged for rotational movements, e.g., roll, pitch, and yaw, during operation.

In another example, the sensor 20 is arranged to have one of roll, pitch, and yaw rotational movements when the sensor 20 senses in translational movement along the x-axis such that the first angle $\theta$ is calculated as:

$$\theta = \sin^{-1} \frac{x}{r \cdot \cos \varphi}.$$

Translational movement of the sensor 20 may include forward/backward movement, side to side movement, and up/down movement. Thus, a sensor body 34 may be disposed in the vehicle compartment 18 and arranged to be movable along one of the x-axis, y-axis, and z-axis for translational movement. As an example, the sensor 20 may have a body 34 movably disposed along a linear track (forward/backward movement) on a portion of an interior panel of the vehicle compartment 18. A lens 36 may be disposed within the body 34 and arranged for rotational movements, e.g., roll, pitch, and yaw.

In yet another example, the sensor 20 is arranged to have one of roll, pitch, and yaw rotational movements when the sensor 20 senses in translational movement along the x-axis and y-axis such that the second angle $\varphi$ is calculated as:

$$\varphi = \tan^{-1} \left( \frac{y}{x} \right).$$

As in the previous embodiment, translational movement of the sensor 20 may include forward/backward movement, side to side movement, and up/down movement. Thus, a sensor body 34 may be disposed in the vehicle compartment 18 and arranged to be movable along the x-axis and y-axis (e.g., forward/backward and side to side movements) for translational movement. For example, the sensor may have a body 34 movably disposed along a circular track on a portion of an interior panel of the vehicle compartment 18. A lens 36 may be disposed within the body 34 and arranged for rotational movement, e.g., roll, pitch, and yaw.

The sensor may be a radio frequency identification (RFID) sensor. That is, the sensor may have an RFID reader and an object may have an RFID tag, allowing the sensor to detect the sensed item data and the position data. The RFID tag may provide readable data of the user and the object thereby providing information as to ownership of the lost item 14 and location/destination of the user.

It is to be understood that the sensor may be an ultrasonic sensor, a radio frequency identification sensor, a radar sensor, or any other suitable sensor without departing from the spirit or scope of the present disclosure.

Referring to FIG. 1, the system 10 further comprises an electronic control unit (ECU) 22 disposed in the vehicle 16. As depicted, the ECU 22 is in communication with the sensor 20 and a handheld device 26 of the owner 12 of the lost item 14. It is to be understood that the ECU 22 comprises modules and algorithms to assist in controlling the system 10.

Moreover, the ECU 22 is arranged to determine a position of the lost item 14 in cartesian coordinates based on the sensed item data to define a position data. The position of the lost item 14 may be determined in a number of ways. For instance, as discussed above in one example, the sensor 20 is arranged to have at least two of roll, pitch, and yaw rotational movements when the sensor 20 senses from a fixed location in the vehicle compartment 18. That is, the sensor 20 may have a body 34 fixedly disposed in the vehicle compartment 18 and a lens 36 disposed within the body 34. Furthermore, the lens 36 may be arranged for rotational movements, e.g., roll, pitch, and yaw, during operation to sense the lost item 14.

Based on the sensed item data from the sensor 20, the lost item 14 may be translated by the ECU 22 in cartesian coordinates having an x-axis, a y-axis, and a z-axis derived as, $$x = r \sin \theta \cos \varphi$$

$$y = r \sin \theta \sin \varphi$$

$$z = r \cos \theta$$

thereby allowing the ECU 22 to determine the position of the lost item 14 in cartesian coordinates defining the position data.

The position of the lost item 14 may be determined in another suitable manner. For instance, as discussed above, the sensor 20 may be arranged to have at least one of roll, pitch, and yaw rotational movements when the sensor 20 senses from translational movement along the x-axis in the vehicle compartment 18 such that the first angle $\theta$ is calculated as:

$$\theta = \sin^{-1} \frac{x}{r \cdot \cos \varphi}.$$

Based on the sensed item data from the sensor 20, the lost item 14 may be translated by the ECU 22 in cartesian coordinates having an x-axis, a y-axis, and a z-axis derived as, $x = r \sin\theta \cos\varphi$ $y = r \sin\theta \sin\varphi$ $z = r \cos\theta$ thereby allowing the ECU 22 to determine the position of the lost item 14 in cartesian coordinates defining the position data.

The position of the lost item 14 may be determined in yet another suitable manner. For instance, as discussed above in another example, the sensor 20 may be arranged to have at least one of roll, pitch, and yaw rotational movements when the sensor 20 senses from translational movement along the x-axis and y-axis in the vehicle compartment 18 such that the second angle φ is calculated as:

$$\varphi = \tan^{-1}\left(\frac{y}{x}\right),$$

Based on the sensed item data from the sensor 20, the lost item 14 may be translated by the ECU 22 in cartesian coordinates having an x-axis, a y-axis, and a z-axis derived as, $x = r \sin\theta \cos\varphi$ $y = r \sin\theta \sin\varphi$ $z = r \cos\theta$ thereby allowing the ECU 22 to determine the position of the lost item 14 in cartesian coordinates defining the position data.

The ECU 22 is further arranged to translate the sensed item data and the position data for visualization of the lost item 14 to define an item image of the lost item 14 relative to the vehicle compartment 18. Based on the sensed item data and the position data, By way of algorithmic modules, the ECU 22 is able to translate the sensed item and the position data to the item image, thereby providing an image of the lost item 14 along with a location of thereof relative to the sensor 20 in the vehicle compartment 18. It is to be understood that the ECU 22 may comprise modules and algorithms to assist in translating the sensed item data and the position data to output the item image and provide a location of the lost item 14.

Additionally, the ECU 22 is arranged to update an inventory list of lost objects to include the lost item 14 with the item image. The inventory list is preferably stored in the ECU 22 and may comprise a "lost" database of left-behind or lost objects in the vehicle compartment 18. To detect an object has been left-behind or lost, the ECU 22 may comprise an object detection module arranged to compare images of the vehicle compartment 18. Such images may be intermittently captured by the sensor 20 as desired. The object detection module may comprise a first perception algorithm that compares images or data of the vehicle compartment 18. As new objects and new users are detected and paired, data of each new object is record in an object database. Along the same lines, left-behind or lost objects may also be detected as users enter and leave the vehicle compartment 18 with and without their respective objects. Objects detected without the paired users may be determined to be "lost" by way of the first perception algorithm. Data of each "lost" object is recorded in the "lost" database.

Furthermore, the ECU 22 is arranged to identify the owner 12 of the lost item 14 during a trip of the vehicle 16.

Generally, the owner 12 of a lost item 14 may be identified by the ECU 22 by way of a user detection module. In one example, the user detection module may be arranged to compare images of the vehicle compartment 18. Such images may be intermittently captured by the sensor 20 as desired. The user detection module may comprise a second perception algorithm that compares images or data of the vehicle compartment 18. As new objects and users are detected and paired, data of each new user is recorded in a database. As lost objects are detected, the user that is paired with the lost object may be identified by way of the second perception algorithm. Data of each user having a lost object may be recorded in a "user" database.

In another example, by way of the ECU 22 with the user detection module, the user/owner 12 of a lost item 14 can be found/identified by recording an identifier of the trip having a trip identification (ID) during which the lost item 14 was detected in the vehicle 16. Subsequently, the trip ID and the owner 12 of the lost item 14 may be matched through a search in a database of trip IDs and users.

Such matching by the ECU 22 may occur in the following steps. In a first step, a new item in the vehicle 16 is identified upon vehicle entry by the user with the new item. The sensor 20 senses and identifies the new item in the vehicle 16. That is, based on a comparison of images/data (e.g., via the user detection module), the new item is identified in the vehicle compartment 18. Thus, the new item had not been present prior to the user entering the vehicle 16.

In a second step, the new item remains in the vehicle after the trip ends and/or the user paired therewith has left the vehicle. By way of a perception algorithm of the ECU 22, the item may be confirmed as a valuable item, e.g., a bag pack, a tablet, a wallet, a bag. In a third step, the item is tagged as "left behind during trip xxx," where xxx is a unique ID of the trip based on time and potentially location such as a start point and an end point.

In a fourth step, the ECU 22 having a user database that matches vehicle users with trip IDs is accessed to match the lost item 14 with its owner 12 by matching trip ID to user ID. Such database may be the same or similar to any suitable user database used for identifying users, matching a passenger with a vehicle/driver, and charging the passenger for a pickup/rental service.

Alternatively, there may be other methods of identifying the owner 12 of a left-behind item without departing from the spirit or scope of the present disclosure. One additional method may include situations where the vehicle has an identification mechanism (e.g., for payments or for personalization). When a user enters the vehicle, the user may log in to a vehicle either manually or as detected by an identification mechanism in the vehicle. The vehicle then can keep track of users in the vehicle. Examples of such identification mechanisms include a fingerprint mechanism, face ID using camera mechanism, phone pairing mechanism, and manual login into an infotainment system.

Another method of identifying the owner 12 may include situations where the vehicle records an image of the driver's face, which can be uploaded to a service that then uses facial identification.

Yet another method of identifying the owner 12 may include situations where a manual request from the owner/user 12 of the lost item 14 can be used to search within a database of lost items.

In still another method of identifying the owner 12 and within a predefined space, a user's pathway and location of the left-behind object can be generated by the ECU 22 with a location module having a location algorithm. Given that the user's pathway is also the object location before the object is left behind, the location module is arranged to retrieve the object path. The object path is then matched with the user path. As an example, the user path may be obtained by using the user's ticket/cell phone location/facial ID. An object can be assigned to a user when a user's time stamp of the path overlaps the time of the object path.

Yet another method of identifying the owner 12 may include situations where radio frequency identification (RFID) is used. In such situations, the owner's information can also be included in an RFID tag.

Referring to FIG. 1, the system 10 further comprises a cloud server 24 disposed remotely from the vehicle 16. As shown, the cloud server 24 is in communication with the ECU 22. In a preferred embodiment, the cloud server 24 is arranged to provide notification to the owner 12 of the lost item 14. When the ECU 22 identifies the owner 12 of the lost item 14 as described above, the ECU 22 sends a signal to the cloud server 24 to inform or notify the owner 12 that an item has been left behind in the vehicle compartment 18.

For example, the cloud server 24 may notify a user by way of an application downloaded on the user's handheld device or phone 26. A notification may be sent to the user from the application, informing the user that a lost item 14 has been detected in the vehicle compartment 18 and that the user has been identified as the owner 12 thereof. It is to be understood that the cloud server 24 may notify the owner 12 of a lost item 14 by email, text message, phone call, voice mail, or any other suitable manner without departing from the scope or spirit of the present disclosure.

Moreover, the cloud server 24 is arranged to provide viewable access of the item image such that the image is viewed by the owner 12 of the lost item 14. That is, the ECU 22 may transmit the item image of the lost item 14 to the cloud server 24 which may be downloaded by the user for viewable access. It is to be understood that the image may be a picture that was captured or a digital visualized shape that was generated using data from the sensor. A user may view the item image by way of the phone application. It is to be understood that the cloud server 24 may provide viewable access of the item image by email, text message, or any other suitable manner without departing from the scope or spirit of the present disclosure.

Additionally, by way of a phone/website application, a user may initiate a search for lost objects, thereby facilitating a way for a user to independently check for lost items that have been paired therewith aside from any notifications from the cloud server 24.

Figure 4:
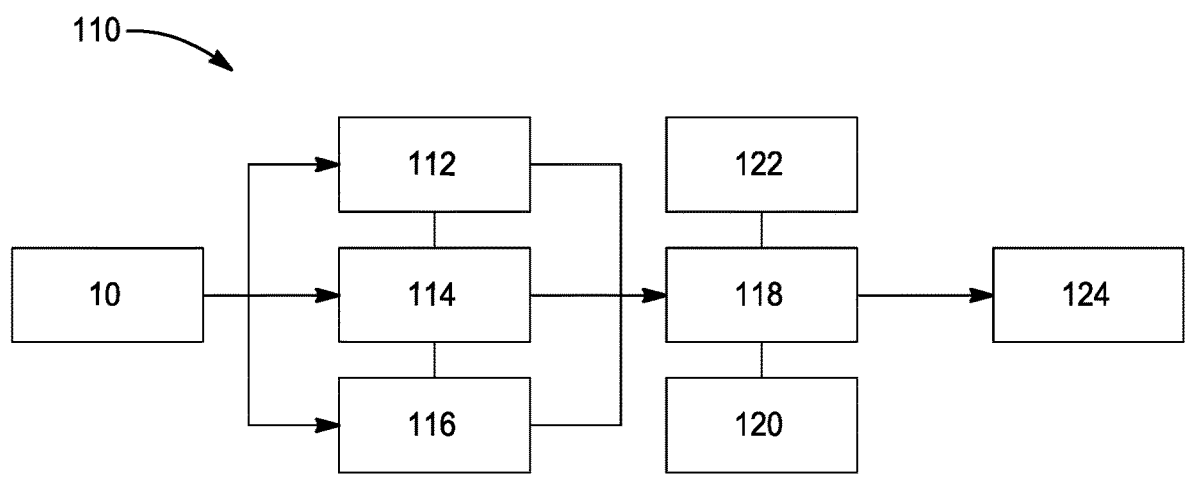
FIG. 4 is a flowchart of a general method of identifying an owner of a lost item in a vehicle having a vehicle compartment for the system in FIG. 1.

FIG. 4 shows a flowchart of a general method 110 of notifying an owner 12 for the system 10 in FIG. 1 in accordance with one example of the present disclosure. As shown, the method 110 comprises the system 10 sensing a presence of the lost item 14 to define a sensed item data in box 112, translating the sensed item data and position data for visualization of the lost item 14 to define an item image in box 114, and determining a location/position of the lost item 14 to define a position data in box 116. Moreover, the general method 110 further comprises updating an inventory list of lost objects with the item image and its corresponding data and identifying the owner 12 of the lost item 14 in box 118. As shown, the general method 110 comprises allowing a user to initiate a search of the lost item 14 in box 120 and allowing manual correction of the inventory list in box 122. Furthermore, the general method 110 comprises notifying the owner 12 by way of in-vehicle/mobile notifications and allowing viewable access of the item image in box 124.

In accordance with one example of the present disclosure, FIG. 5 depicts a flowchart of a method 210 of notifying an owner 12 of a lost item 14 in a vehicle 16 having a vehicle compartment 18 implemented by the system 10 of FIG. 1. As shown, the method 210 comprises a step 212 of providing at least one sensor 20 to sense the lost item 14 in the vehicle compartment 18. As discussed above for the system 10, the at least one sensor 20 may be an ultrasonic sensor and is disposed in the vehicle compartment 18. However, it is to be understood that the sensor may be an ultrasonic sensor, a radio frequency identification sensor, a radar sensor, or any other suitable sensor without departing from the spirit or scope of the present disclosure.

As shown in FIG. 5, the method 210 further comprises a step 214 of sensing the lost item 14 on a point 30 relative to a spherical coordinate system 32 (FIG. 3) to define a sensed item data. As discussed, the sensor 20 may be arranged to sense the lost item 14 on a point 30 relative to a spherical coordinate system 32 to define a sensed item data. In one embodiment, the point 30 relative to the spherical coordinate system 32 is defined by a distance r, a first angle ($\theta$), and a second angle ($\varphi$). Moreover, the lost item 14 may be translated in cartesian coordinates having an x-axis, a y-axis, and a z-axis derived as, $$x = r \sin \theta \cos \varphi$$

$$y = r \sin \theta \sin \varphi$$

$$z = r \cos \theta$$

In one example, the sensor 20 is arranged to have two of roll, pitch, and yaw rotational movements when the sensor 20 senses from a fixed location in the vehicle compartment 18. That is, the sensor 20 may have a body 34 fixedly disposed in the vehicle compartment 18 and a lens 36 disposed within the body 34. Moreover, the lens 36 may be arranged for rotational movements, e.g., roll, pitch, and yaw, during operation.

In another example, the sensor 20 is arranged to have one of roll, pitch, and yaw rotational movements when the sensor 20 senses in translational movement along the x-axis such that the first angle $\theta$ is calculated as:

$$\theta = \sin^{-1} \frac{x}{r \cdot \cos \varphi}.$$

Translational movement of the sensor 20 may include forward/backward movement, side to side movement, and up/down movement. Thus, a sensor body 34 may be disposed in the vehicle compartment 18 and arranged to be movable along one of the x-axis, y-axis, and z-axis for translational movement. As an example, the sensor may have a body 34 movably disposed along a linear track (forward/backward movement) on a portion of an interior panel of the vehicle compartment 18. A lens 36 may be disposed within the body 34 and arranged for rotational movements, e.g., roll, pitch, and yaw.

In yet another example, the sensor 20 is arranged to have one of roll, pitch, and yaw rotational movements when the sensor 20 senses in translational movement along the x-axis and y-axis such that the second angle $\varphi$ is calculated as:

$$\varphi = \tan^{-1}\left(\frac{y}{x}\right).$$

As in the previous embodiment, translational movement of the sensor 20 may include forward/backward movement, side to side movement, and up/down movement. Thus, a sensor body 34 may be disposed in the vehicle compartment 18 and arranged to be movable along the x-axis and y-axis (e.g., forward/backward and side to side movements) for translational movement. For example, the sensor may have a body 34 movably disposed along a circular track on a portion of an interior panel of the vehicle compartment 18. A lens 36 may be disposed within the body 34 and arranged for rotational movement, e.g., roll, pitch, and yaw.

The method 210 further comprises a step 216 of determining a position of the lost item 14 in cartesian coordinates based on the sensed item data to define a position data. As discussed above, the ECU 22 is arranged to determine a position of the lost item 14 in cartesian coordinates based on the sensed item data to define a position data. The position of the lost item 14 may be determined in a number of ways. For instance, as discussed above in one example, the sensor 20 is arranged to have at least two of roll, pitch, and yaw rotational movements when the sensor 20 senses from a fixed location in the vehicle compartment 18. That is, the sensor may have a body 34 fixedly disposed in the vehicle compartment 18 and a lens 36 disposed within the body 34. Furthermore, the lens 36 may be arranged for rotational movements, e.g., roll, pitch, and yaw, during operation to sense the lost item 14.

Based on the sensed item data from the sensor 20, the lost item 14 may be translated by the ECU 22 in cartesian coordinates having an x-axis, a y-axis, and a z-axis derived as, $x = r \sin\theta \cos\varphi$ $y = r \sin\theta \sin\varphi$ $z = r \cos\theta$ thereby allowing the ECU 22 to determine the position of the lost item 14 in cartesian coordinates defining the position data.

The position of the lost item 14 may be determined in another suitable manner. For instance, as discussed above, the sensor 20 may be arranged to have at least one of roll, pitch, and yaw rotational movements when the sensor 20 senses from translational movement along the x-axis in the vehicle compartment 18 such that the first angle $\theta$ is calculated as:

$$\theta = \sin^{-1}\frac{x}{r \cdot \cos\varphi}.$$

Based on the sensed item data from the sensor 20, the lost item 14 may be translated by the ECU 22 in cartesian coordinates having an x-axis, a y-axis, and a z-axis derived as, $x = r \sin\theta \cos\varphi$ $y = r \sin\theta \sin\varphi$ $z = r \cos\theta$ thereby allowing the ECU 22 to determine the position of the lost item 14 in cartesian coordinates defining the position data.

The position of the lost item 14 may be determined in yet another suitable manner. For instance, as discussed above in another example, the sensor 20 may be arranged to have at least one of roll, pitch, and yaw rotational movements when the sensor 20 senses from translational movement along the x-axis and y-axis in the vehicle compartment 18 such that the second angle $\varphi$ is calculated as:

$$\varphi = \tan^{-1}\left(\frac{y}{x}\right),$$

Based on the sensed item data from the sensor 20, the lost item 14 may be translated by the ECU 22 in cartesian coordinates having an x-axis, a y-axis, and a z-axis derived as, $x = r \sin\theta \cos\varphi$ $y = r \sin\theta \sin\varphi$ $z = r \cos\theta$ thereby allowing the ECU 22 to determine the position of the lost item 14 in cartesian coordinates defining the position data.

The method 210 further comprises a step 218 of translating the sensed item data and the position data for visualization of the lost item 14 to define an item image of the lost item 14 relative to the vehicle compartment 18. As described for the system 10 above, the ECU 22 is arranged to translate the sensed item data and the position data for visualization of the lost item 14 to define an item image of the lost item 14 relative to the vehicle compartment 18. Based on the sensed item data and the position data, by way of algorithmic modules, the ECU 22 is able to translate the sensed item and the position data to the item image, thereby providing an image of the lost item 14 along with a location of thereof relative to the sensor 20 in the vehicle compartment 18. It is to be understood that the ECU 22 may comprise modules and algorithms to assist in translating the sensed item data and the position data to output the item image and provide a location of the lost item 14.

The method 210 further comprises a step 220 of updating an inventory list of lost objects to include the lost item 14 with the item image. As described above, the ECU 22 is arranged to update an inventory list of lost objects to include the lost item 14 with the item image. The inventory list is preferably stored in the ECU 22 and may comprise a "lost" database of left-behind or lost objects in the vehicle compartment 18. To detect an object has been left-behind or lost, the ECU 22 may comprise an object detection module arranged to compare images of the vehicle compartment 18. Such images may be intermittently captured by the sensor 20 as desired. The object detection module may comprise a first perception algorithm that compares images or data of the vehicle compartment 18. As new objects and new users are detected and paired, data of each new object is record in an object database. Along the same lines, left-behind or lost objects may also be detected as users enter and leave the vehicle compartment 18 with and without their respective objects. Objects detected without the paired users may be determined to be "lost" by way of the first perception algorithm. Data of each "lost" object is recorded in the "lost" database.

The method 210 further comprises a step 222 of identifying the owner 12 of the lost item 14 by way of a perception algorithm. As stated above, the ECU 22 is arranged to identify the owner 12 of the lost item 14 during a trip of the vehicle 16. Generally, the owner 12 of a lost item 14 may be identified by the ECU 22 by way of a user detection module.

In one example, the user detection module may be arranged to compare images of the vehicle compartment 18. Such images may be intermittently captured by the sensor 20 as desired. The user detection module may comprise a second perception algorithm that compares images or data of the vehicle compartment 18. As new objects and users are detected and paired, data of each new user is recorded in a database. As lost objects are detected, the user that is paired with the lost object may be identified by way of the second perception algorithm. Data of each user having a lost object may be recorded in a "user" database.

In another example, by way of the ECU 22 with the user detection module, the user/owner 12 of a lost item 14 can be found/identified by recording an identifier of the trip having a trip identification (ID) during which the lost item 14 was detected in the vehicle 16. Subsequently, the trip ID and the owner 12 of the lost item 14 may be matched through a search in a database of trip IDs and users.

As mentioned above, such matching by the ECU 22 may occur in the following steps. In a first step, a new item in the vehicle 16 is identified upon vehicle entry by the user with the new item. The sensor 20 senses and identifies the new item in the vehicle. That is, based on a comparison of images/data (e.g., via the user detection module), the new item is identified in the vehicle compartment 18. Thus, the new item had not been present prior to the user entering the vehicle.

In a second step, the new item remains in the vehicle after the trip ends and/or the user paired therewith has left the vehicle. By way of a perception algorithm of the ECU 22, the item may be confirmed as a valuable item, e.g., a bag pack, a tablet, a wallet, a bag. In a third step, the item is tagged as "left behind during trip xxx," where xxx is a unique ID of the trip based on time and potentially location such as a start point and an end point.

In a fourth step, the ECU 22 having a user database that matches vehicle users with trip IDs is accessed to match the lost item 14 with its owner 12 by matching trip ID to user ID. Such database may be the same or similar to any suitable user database used for identifying users, matching a passenger with a vehicle/driver, and charging the passenger for a pickup/rental service.

Alternatively, there may be other methods of identifying the owner 12 of a left-behind item without departing from the spirit or scope of the present disclosure.

The method 210 further comprises a step 224 of providing notification to the owner 12 of the lost item 14. As provided above, the cloud server 24 is arranged to provide notification to the owner 12 of the lost item 14. When the ECU 22 identifies the owner 12 of the lost item 14 as described above, the ECU 22 sends a signal to the cloud server 24 to inform or notify the owner 12 that an item has been left behind in the vehicle compartment 18. For example, the cloud server 24 may notify a user by way of an application downloaded on the user's phone. A notification may be sent to the user from the application, informing the user that a lost item 14 has been detected in the vehicle compartment 18 and that the user has been identified as the owner 12 thereof. It is to be understood that the cloud server 24 may notify the owner 12 of a lost item 14 by email, text message, phone call, voice mail, or any other suitable manner without departing from the scope or spirit of the present disclosure.

The method 210 further comprises a step 226 of providing viewable access of the item image such that the image is viewed by the owner 12 of the lost item 14. As discussed for the system 10, the cloud server 24 is arranged to provide viewable access of the item image such that the image is viewed by the owner 12 of the lost item 14. That is, the ECU 22 may transmit the item image of the lost item 14 to the cloud server 24 which may be downloaded by the user for viewable access. A user may view the item image by way of the phone application. It is to be understood that the cloud server 24 may provide viewable access of the item image by email, text message, or any other suitable manner without departing from the scope or spirit of the present disclosure.

Additionally, by way of a phone/website application, a user may initiate a search for lost objects, thereby facilitating a way for a user to independently check for lost items that have been paired therewith aside from any notifications from the cloud server 24.

In accordance with another example of the present disclosure, FIG. 6 depicts a flowchart of a method 310 of notifying an owner 12 of a lost item 14 in a vehicle 16 having a vehicle compartment 18 implemented by the system 10 of FIG. 1. As shown, the method 310 comprises providing at least one sensor 20 to sense the lost item 14 in the vehicle compartment 18 in box 312. Moreover, the method 310 further comprises sensing the lost item 14 on a point 30 relative to a spherical coordinate system 32 (FIG. 3) to define a sensed item data in box 314. In this aspect, the point 30 is defined by a distance r, a first angle (θ), and a second angle (φ). The lost item 14 has cartesian coordinates having an x-axis, a y-axis, and a z-axis derived as, $x = r \sin \theta \cos \varphi$ $y = r \sin \theta \sin \varphi$ $z = r \cos \theta$ The method 310 further comprises determining a position of the lost item 14 in cartesian coordinates based on the sensed item data to define a position data in box 316. The sensor 20 is arranged to have two of roll, pitch, and yaw rotational movements when the sensor 20 senses in a fixed location in the vehicle compartment 18, wherein the sensor 20 is arranged to have one of roll, pitch, and yaw rotational movements when the sensor 20 senses in movement along the x-axis such that the first angle θ is calculated as:

$$\theta = \sin^{-1} \frac{x}{r \cdot \cos \varphi}.$$

In this aspect, the sensor 20 is arranged to have one of roll, pitch, and yaw rotational movements when the sensor 20 senses in movement along the x-axis and y-axis such that the second angle φ is calculated as:

$$\varphi = \tan^{-1}\left(\frac{y}{x}\right).$$

Moreover, the method 310 comprises translating the sensed item data and the position data for visualization of the lost item 14 to define an item image of the lost item 14 relative to the vehicle compartment 18 in box 318. Further, the method 310 comprises updating an inventory list of lost objects to include the lost item 14 with the item image in box 320. Additionally, the method 310 comprises identifying the owner 12 of the lost item 14 by way of a perception algorithm in box 322. The method 310 further comprises providing notification to the owner 12 of the lost item 14 in box 324. Furthermore, the method 310 comprises providing viewable access of the item image such that the image is viewed by the owner 12 of the lost item 14 in box 326.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of notifying an owner of a lost item in a vehicle during a trip, the vehicle having a vehicle compartment, the method comprising:
    providing at least one sensor to sense the lost item in the vehicle compartment;
    sensing, at an end of the trip when an occupant of the vehicle has left the vehicle, the lost item on a point relative to a spherical coordinate system to define a sensed item data;
    determining a position of the lost item in cartesian coordinates based on the sensed item data to define a position data;
    translating the sensed item data and the position data for visualization of the lost item to define an item image of the lost item relative to the vehicle compartment;
    updating an inventory list of lost objects to include the lost item with the item image;
    tagging the lost item in the inventory list with a trip identifier that is unique to the trip;
    matching the trip identifier with a user identifier that is unique to the last occupant of the vehicle during the trip associated with the trip identifier;
    identifying the owner of the lost item by matching the trip identifier with the user identifier;
    providing notification to the owner of the lost item; and
    providing viewable access of the item image such that the image is viewed by the owner of the lost item.

2. The method of claim 1 wherein the point relative to the spherical coordinate system is defined by a distance r, a first angle (θ), and a second angle (φ), wherein the lost item has cartesian coordinates having an x-axis, a y-axis, and a z-axis derived as, $$x = r \sin\theta \cos\varphi$$

$$y = r \sin\theta \sin\varphi$$

$$z = r \cos\theta.$$

3. The method of claim 2 wherein the step of determining the position of the lost item comprises the sensor being arranged to have two of roll, pitch, and yaw rotational movements when the sensor senses in a fixed location in the vehicle compartment.

4. The method of claim 2 wherein the step of determining the position of the lost item comprises the sensor being arranged to have one of roll, pitch, and yaw rotational movements when the sensor senses in movement along the x-axis such that the first angle θ is calculated as:

$$\theta = \sin^{-1}\frac{x}{r \cdot \cos\varphi}.$$

5. The method of claim 2 wherein the step of determining the position of the lost item comprises the sensor being arranged to have one of roll, pitch, and yaw rotational movements when the sensor senses in movement along the x-axis and y-axis such that the second angle φ is calculated as:

$$\varphi = \tan^{-1}\left(\frac{y}{x}\right).$$

6. The method of claim 2 wherein the at least one sensor is fixedly disposed in the vehicle compartment.

7. The method of claim 2 wherein the at least one sensor is disposed in the vehicle compartment and movable along the x-axis.

8. The method of claim 2 wherein the at least one sensor is disposed in the vehicle compartment and movable along the x-axis and y-axis.

9. The method of claim 1 wherein the at least one sensor is one of an ultrasonic sensor and an RFID sensor.

10. A system for notifying an owner of a lost item in a vehicle during a trip, the vehicle having a vehicle compartment, the system comprising:
    at least one sensor disposed in the vehicle compartment and arranged to sense the lost item on a point relative to a spherical coordinate system to define a sensed item data;
    an electronic control unit (ECU) disposed in the vehicle and in communication with the at least one sensor, the ECU arranged to determine, at an end of the trip when an occupant of the vehicle has left the vehicle, a position of the lost item in cartesian coordinates based on the sensed item data to define a position data, the ECU arranged to translate the sensed item data and the position data for visualization of the lost item to define an item image of the lost item relative to the vehicle compartment, the ECU arranged to update an inventory list of lost objects to include the lost item with the item image, the ECU arranged to tag the lost item in the inventory list with a trip identifier that is unique to the trip, the ECU arranged to match the trip identifier with a user identifier that is unique to the last occupant of the vehicle during the trip associated with the trip identifier, and the ECU arranged to identify the owner of the lost item by matching the trip identifier with the user identifier; and
    a cloud server disposed remotely from the vehicle and in communication with the ECU, the cloud server arranged to provide notification to the owner of the lost item, the cloud server arranged to provide viewable access of the item image such that the image is viewed by the owner of the lost item.

11. The system of claim 10 wherein the point relative to the spherical coordinate system is defined by a distance r, a first angle (θ), and a second angle (φ), wherein the lost item has cartesian coordinates having an x-axis, a y-axis, and a z-axis derived as, $$x = r \sin\theta \cos\varphi$$

$$y = r \sin\theta \sin\varphi$$

$$z = r \cos\theta.$$

12. The system of claim 11 wherein the ECU is arranged to determine a position of the lost item comprises the sensor being arranged to have two of roll, pitch, and yaw rotational movements when the sensor senses in a fixed location in the vehicle compartment.

13. The system of claim 11 wherein the ECU is arranged to determine a position of the lost item comprises the sensor being arranged to have one of roll, pitch, and yaw rotational movements when the sensor senses in movement along the x-axis such that the first angle θ is calculated as:

$$\theta = \sin^{-1}\frac{x}{r\cdot\cos\varphi}.$$

14. The system of claim 11 wherein the ECU is arranged to determine a position of the lost item comprises the sensor being arranged to have one of roll, pitch, and yaw rotational movements when the sensor senses in movement along the x-axis and y-axis such that the second angle φ is calculated as:

$$\varphi = \tan^{-1}\left(\frac{y}{x}\right).$$

15. The system of claim 11 wherein the at least one sensor is fixedly disposed in the vehicle compartment.

16. The system of claim 11 wherein the at least one sensor is disposed in the vehicle compartment and movable along the x-axis.

17. The system of claim 11 wherein the at least one sensor is disposed in the vehicle compartment and movable along the x-axis and y-axis.

18. The system of claim 11 wherein the at least one sensor is one of an ultrasonic sensor and an RFID sensor.

19. A method of notifying an owner of a lost item in a vehicle during a trip, the vehicle having a vehicle compartment, the method comprising:

providing at least one sensor to sense the lost item in the vehicle compartment;

sensing, at an end of the trip when an occupant of the vehicle has left the vehicle, the lost item on a point relative to a spherical coordinate system to define a sensed item data, the point being defined by a distance r, a first angle (θ), and a second angle (φ), wherein the lost item has cartesian coordinates having an x-axis, a y-axis, and a z-axis derived as, $x = r \sin\theta \cos\varphi$ $y = r \sin\theta \sin\varphi$ $z = r \cos\theta;$ determining a position of the lost item in cartesian coordinates based on the sensed item data to define a position data, wherein the sensor is arranged to have two of roll, pitch, and yaw rotational movements when the sensor senses in a fixed location in the vehicle compartment, wherein the sensor is arranged to have one of roll, pitch, and yaw rotational movements when the sensor senses in movement along the x-axis such that the first angle θ is calculated as:

$$\theta = \sin^{-1}\frac{x}{r\cdot\cos\varphi},$$

wherein the sensor is arranged to have one of roll, pitch, and yaw rotational movements when the sensor senses in movement along the x-axis and y-axis such that the second angle φ is calculated as:

$$\varphi = \tan^{-1}\left(\frac{y}{x}\right).$$

translating the sensed item data and the position data for visualization of the lost item to define an item image of the lost item relative to the vehicle compartment;

updating an inventory list of lost objects to include the lost item with the item image;

tagging the lost item in the inventory list with a trip identifier that is unique to the trip;

matching the trip identifier with a user identifier that is unique to the last occupant of the vehicle during the trip associated with the trip identifier;

identifying the owner of the lost item by matching the trip identifier with the user identifier;

providing notification to the owner of the lost item; and providing viewable access of the item image such that the image is viewed by the owner of the lost item.

* * * * *